United States Patent [19]

Tokieda et al.

[11] Patent Number: 5,295,526
[45] Date of Patent: Mar. 22, 1994

[54] RUN-FLAT PNEUMATIC RADIAL TIRE

[75] Inventors: Akinori Tokieda, Fujisawa; Kazuyoshi Saneto, Hadano; Hiroaki Matsuzaki, Kawasaki, all of Japan

[73] Assignee: The Yokohama Rubber Co., Ltd., Tokyo, Japan

[21] Appl. No.: 864,719

[22] Filed: Apr. 8, 1992

Related U.S. Application Data

[62] Division of Ser. No. 564,527, Aug. 9, 1990, Pat. No. 5,131,445.

[30] Foreign Application Priority Data

Sep. 8, 1989 [JP] Japan .................. 1-231674
Jun. 29, 1990 [JP] Japan .................. 2-170120

[51] Int. Cl.⁵ .................. B60C 17/00; B60C 15/06
[52] U.S. Cl. .................. 152/517; 152/546; 152/552; 152/555
[58] Field of Search .............. 152/516, 517, 546, 552, 152/555

[56] References Cited

U.S. PATENT DOCUMENTS

| | | | |
|---|---|---|---|
| 4,120,338 | 10/1978 | Mirtain | 152/546 |
| 4,193,437 | 3/1980 | Powell | 152/517 |
| 4,917,164 | 4/1990 | Uskikubo | 152/517 |

FOREIGN PATENT DOCUMENTS

| | | | |
|---|---|---|---|
| 3-143710 | 6/1991 | Japan | 152/517 |
| 1423401 | 2/1976 | United Kingdom . | |
| 2138367 | 10/1984 | United Kingdom | 152/517 |

*Primary Examiner*—Michael W. Ball
*Assistant Examiner*—Nancy T. Krawczyk
*Attorney, Agent, or Firm*—Nikaido, Marmelstein, Murray & Oram

[57] ABSTRACT

A run-flat pneumatic radial tire having an aspect ratio of up to 50%, which includes a reinforcing liner layer made of a rubber having a complex modulus at 20° C. $E^*_{20}$, a ratio of a complex modulus at 100° C. to the complex modulus at 20° C., a 100% modulus and a loss tangent (tan δ) at 100° C. which satisfy certain specified numeric values. The liner has a crescent sectional shape and is disposed in sidewall portions of a carcass layer with its end portions overlapping the end portions of a belt layer and a bead filler having a specified hardness and height h from a wheel rim base. The carcass layer consists of an inner carcass layer turned up around the bead core from inside to outside the tire so that its end portion is positioned at a position higher than the height h of the bead filler and an outer carcass layer having an end portion disposed axially outward of the bead core.

4 Claims, 1 Drawing Sheet

RUN-FLAT PNEUMATIC RADIAL TIRE

This is a division of application Ser. No. 564,527 filed Aug. 9, 1990, U.S. Pat. No. 5,131,445.

BACKGROUND OF THE INVENTION

This invention relates to a pneumatic radial tire having improved run-flat durability.

A run-flat pneumatic tire is the tire which can keep running for a predetermined distance even when an internal pressure of the tire drops drastically due to puncture and the like. To provide such run-flat performance, conventional run-flat tires are primarily directed to reduce heat generation at sidewall portions by increasing mainly rigidity of the sidewall portions as much as possible and making it more difficult for the tires to undergo flexibility. For example, Japanese patent application Kokai publication No. 64-30809 proposes a flat run-flat tire having a reinforcing liner layer which has a crescent sectional shape, is made of a rubber having a JIS - A hardness of 50 to 65 and is disposed on the inner surface of the sidewall portions of a tire having an aspect ratio of up to 55% so that its upper end overlaps with a belt layer and its lower end overlaps with a bead filler, from the aspect that the lower the aspect ratio of the tire, the higher can be made rigidity and more difficult does it become for the tire to undergo flexibility.

However, since these tires are directed to increase rigidity of the sidewall portions as much as possible so as to reduce their deflection, general excellent running performance inherent to the radial tires are reduced unavoidably. If rigidity of the sidewall portions is extremely increased in radial tires having a low aspect ratio, local strain increases particularly at the portion ranging from near the upper end of a rim flange to a belt edge of a ground contact portion because the height of the sidewall portions is small, so that run-flat durability drops.

SUMMARY OF THE INVENTION

It is therefore an object of the present invention to provide a run-flat pneumatic radial tire having run-flat durability without deteriorating markedly ordinary running characteristics of the radial tires while making the most of the features of a tire having a low aspect ratio in the aspect of rigidity.

In a run-flat pneumatic radial tire having an aspect ratio of up to 50%, the object of the present invention described above can be accomplished by a run-flat tire characterized in that a reinforcing liner layer made of a rubber having a complex modulus at 20° C., $E^*_{20}$, of at least 16 MPa and preferably up to 60 MPa, a ratio of a dynamic elastic modulus at 100° C., $E^*_{100}$, to the dynamic elastic modulus at 20° C., $E^*_{20}$, that is, $E^*_{100}/E^*_{20}$, of at least 0.80 and preferably up to 1.00, a 100% modulus of at least 60 kg/cm$^2$ and preferably up to 120 kg/cm$^2$, and a loss tangent (tan δ) at 100° C. of up to 0.35 and preferably at least 0.05, and having a crescent sectional shape, is disposed inside a carcass layer at sidewall portions in such a manner that one of its end portions overlaps with the end portion of a belt layer of a tread portion and the other end portion overlaps with a bead filler of the bead portion;

the bead filler of the bead portion is made of a rubber having a JIS - A hardness of from 60 to 80 and has a height h of up to 35 mm from its rim base in a direction vertical to the axis of rotation of the tire;

The carcass layer consists of inner and outer two layers, the inner carcass layer is turned up from inside to outside the tire around the bead core so that its end is positioned at a position higher than the height h of the bead filler and is clamped between the inner carcass layer and the outer carcass layer; and the outer carcass layer is wound down without being turned up around the bead core in such a manner as to position its end near the bead core, or both of the two carcass layers are turned up around the bead core from inside to outside the tire so that the end of the carcass layer on the side of the bead core is disposed near the bead core and the end of the other carcass layer is disposed beyond the upper end of the bead filler.

DESCRIPTION OF THE PREFERRED EMBODIMENTS

Figure 1:
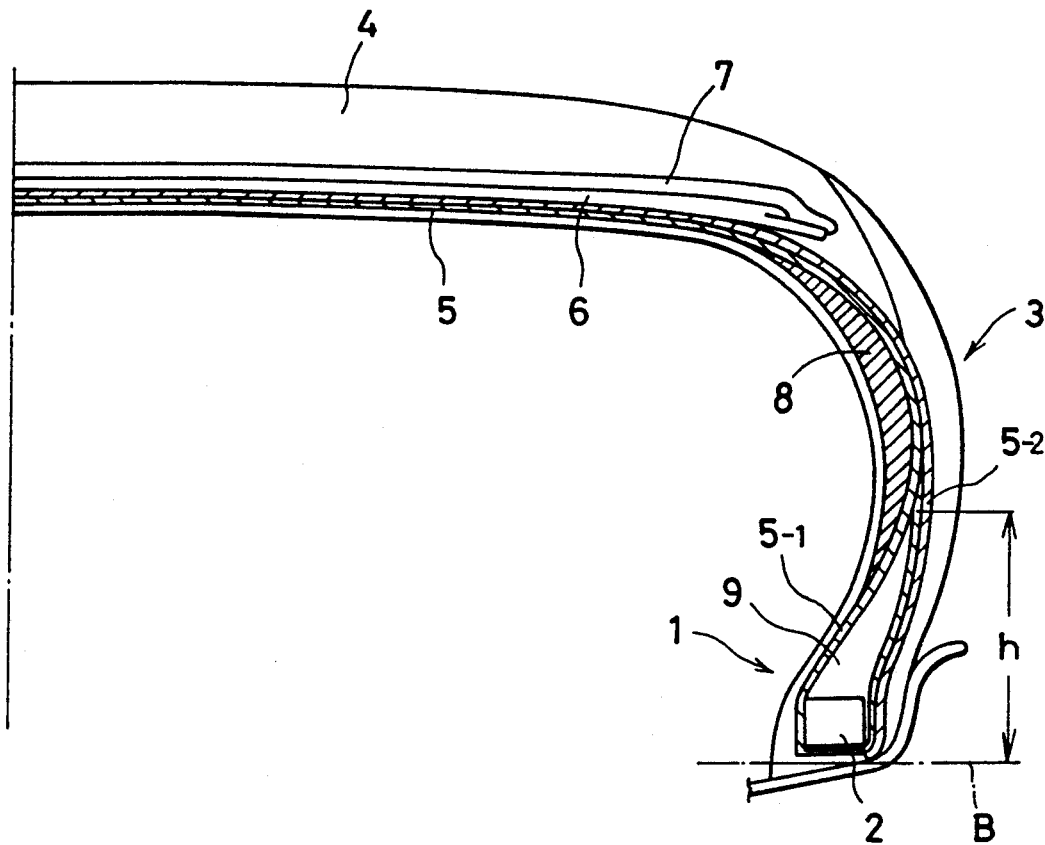
FIGS. 1 and 2 are semi-sectional views, showing an example of the tire of the present invention.

As shown in FIG. 1, the tire of the present invention is a flat tire which consists of bead portions 1, a pair of right and left sidewall portions 3 continuing from the bead portions 1 and a tread portion extending in the tire circumferential direction between these sidewall portions 3, and which has an aspect ratio of below 50% expressed by the ratio of the tire sectional height to the tire maximum sectional width. When the aspect ratio is set to be below 50%, rigidity of the sidewall portions of the present tire can be made higher and the tire can be made more difficult to undergo flexibility than a high aspect ratio tire having the sidewall portions made of the same rubber.

A carcass layer 5 consisting of cords crossing substantially at 90° to the tire circumferential direction has a two-layered structure consisting of an inner carcass layer 5-1 which is disposed between the bead portions 1 and whose both ends are turned up from inside to outside of the tire around the bead cores 2 disposed at the bead portions 1 of the tire and an outer carcass layer 5-2 which extends down to a position outside the bead cores 2. Each end of the inner carcass layer 5-1 turned up around the bead core 2 is clamped between the a portion carcass layer 5-1 before the inner carcass layer is turned up and the outer carcass layer 5-2. Two belt layers 6 which have a cord angle of 10°~30° relative to the tire circumferential direction and cross one another are disposed on the carcass layer 5 at the tread portion 4 and a cover layer 7 is disposed further on this belt layer 6.

A reinforcing liner layer 8 whose upper end in the radial direction overlaps with the lower end of the belt layer 6 and whose lower end in the radial direction overlaps with a bead filler 9 and which has a crescent sectional shape is disposed inside the carcass layer 5 of each sidewall portion 3. The bead filler 9 is disposed above the bead core 2 and wrapped in by the main body of the inner carcass layer 5-1 and the inner carcass layer 5-1 which is turned up from inside to outside the tire around the bead core 2.

In the present invention, the reinforcing liner layer to be disposed inside each sidewall portion must have a crescent sectional shape so that the thickness is the greatest at the center and decreases gradually towards the upper and lower portions in the radial direction of the tire, respectively. Moreover, this crescent sectional shape must be such that one of its ends overlaps with the end portion of the belt layer and the other end overlaps with the bead filler of each bead portion. When the reinforcing liner layer has such a sectional shape, the sidewall portion undergoes smooth deformation, prevents the occurrence of local strain and can limit the drop of general running performance of a radial tire because suitable flexibility is permitted.

The rubber constituting the crescent reinforcing liner layer described above must have a complex modulus $E^*_{20}$ at 20° C. of at least 16 MPa. For, if the complex modulus $E^*_{20}$ is lower than 16 MPa under the condition of the aspect ratio of below 50%, the local strain of the reinforcing liner layer is increased. The rubber described above must keep this standard not only at 20° C. but also when the temperature rises due to running. Therefore, the ratio of the complex modulus $E^*_{100}$ at 100° C. to $E^*_{20}$, that is, $E^*_{100}/E^*_{20}$, of this rubber must be at least 0.80. Furthermore, this rubber must have a 100% modulus of at least 60 kg/cm$^2$. If the 100% modulus is less than 60 kg/cm$^2$, distortion of the tire sidewall portions becomes great as a whole at the time of run-flat running and destruction of the tire is promoted.

Moreover, tan $\delta$ of this rubber at 100° C. must be below 0.35. If any rubber having tan $\delta$ exceeding this value is used, heat generation at the reinforcing liner layer becomes so great at the time of bending that deflection of the side portions becomes great and run-flat durability drops.

In the present invention, the complex modulus at 20° C. $E^*_{20}$, the complex modulus at 100° C. $E^*_{100}$ and tan $\delta$ at 100° C. are measured under the condition of a frequency of 20 Hz, an initial strain of 5% and a dynamic strain 1% elongation by use of a viscoelastic spectromer "Rheograph Solid" produced by Toyo Seiki K.K., respectively. The 100% modulus is measured by the measurement method stipulated in JIS K 6301.

If the thickness of the reinforcing liner layer having the crescent sectional shape is small, the effect of improving run-flat performance cannot be obtained. Therefore, this thickness is generally made greater with an increasing weight of a vehicle. If this thickness is too great, rigidity becomes too great, and general running characteristics as a radial tire will drop. It is therefore advisable that the maximum thickness of this reinforcing liner layer be from 3 mm to 8 mm.

In the tire of the present invention, the bead filler is made of a rubber having a JIS - A hardness of 60 to 80 which is lower than the hardness of the reinforcing liner layer, and its height h from a rim base in a direction vertical to the axis of rotation of the tire must be smaller than 35 mm. If the hardness of the bead filler is greater than JIS - A hardness of 80 or if the height h is greater than 35 mm, the local strain of the sidewall portions is increased and smooth deformation becomes difficult to occur. If the JIS - A hardness of the bead filler is lower than 60, general running performance of the radial tire such as maneuvering stability will drop. In the present invention, the JIS - A hardness described above is the value measured by the measurement method stipulated in JIS K 6301.

Figure 2:
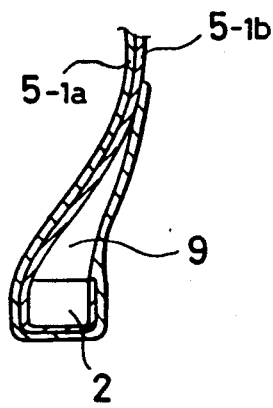

In the tire of the present invention, the structure of the carcass layer around the beads becomes another important factor in order to insure the smooth deformation and to reduce the local strain while imparting suitable rigidity to the sidewall portions and permitting small flexibility. As shown in FIG. 1, in the two-layered carcass layer, the inner carcass layer 5-1 is turned up around the bead core 2 from inside to outside the tire in such a manner as to position its end to a position higher than the height h of the bead filler 9 and to be clamped by the outer carcass layer 5-2 extending down to a position axially outside the bead core 2. Alternatively, as shown in FIG. 2, two carcass layers 5-1a and 5-1b are turned up around the bead core 2 from inside to outside the tire, the end of one of the carcass layers 51-b is disposed near the bead core 2 and the end of the other carcass layer 5-1a is turned up beyond the upper end of the bead filler 9. Among these structures, the tire having the carcass layer of the structure shown in FIG. 1 is superior from the aspect of run-flat durability. These carcass layer structures exhibit the synergistic effects in improving flexibility resistance and limiting the local strain when combined with the reinforcing liner layer and make smooth deformation possible, so that run-flat durability can be improved remarkably.

In the tire of the present invention, known tire retaining mechanisms, such as the bead shape and the rim structure are naturally employed in order to prevent rolling-off of the tire from the rim even when the air pressure of the tire drops.

Hereinafter, effectiveness of each of the constituent requirements of the present invention described above will be explained with reference to Examples.

In each of the following Examples, the term "run-flat durability" represents the value obtained by measuring the distance until the tires get out of order when the test tires are fitted to a vehicle receiving a load of 500 kg per tire and so as to prevent the test tires from rolling off from the rims at an air pressure of 0 kg/cm$^2$.

In each Example, run-flat durability is represented by an index and the greater this index value, the higher run-flat durability.

EXAMPLE 1

Seven kinds of tires A, B, C, D, E, F and G are produced and their run-flat durability is evaluated. Each tire is a radial tire having the structure shown in FIG. 1, the following tire specification and a rubber blend composition (Table 1) for the bead filler in common with the others but having different rubber characteristics only for the reinforcing liner layer, as tabulated in Table 2. The size of each tire is 255/40R17.

Incidentally, run-flat durability is an index using the evaluation result of the tire B as 100.

belt cover layer = nylon cord having cord angle of 0° with respect to the tire circumferential direction
belt layer = steel belt having a crossing angle of 24°
carcass layer = rayon cords
JIS - A hardness of bead filler = 75, height h = 33 mm
maximum thickness of reinforcing liner layer = 5 mm
aspect ratio = 40%

TABLE 1

| blend component | Blend amount (parts per hundred rubber) |
| --- | --- |
| natural rubber (SIR 20) | 70.00 |
| SBR "Nipol" 1502* | 30.00 |
| zinc oxide | 5.00 |
| stearic acid | 2.00 |
| anti-oxidant | 1.00 |
| carbon black HAF | 70.00 |
| aromatic oil | 7.00 |

TABLE 1-continued

| blend component | Blend amount (parts per hundred rubber) |
| --- | --- |
| accelerator | 1.00 |
| sulfur | 3.00 |

*A tradename for a low temperature polymerization styrene-butadiene rubber (SBR) manufactured by Nippon Zeon K.K., a corporation of Japan.

TABLE 2

| | | Tire A Comp. Ex. | Tire B Invention | Tire C Invention | Tire D Comp. Ex. | Tire E Comp. Ex. | Tire F Comp. Ex. | Tire G Invention |
| --- | --- | --- | --- | --- | --- | --- | --- | --- |
| Blend Composition | natural rubber TSR*[1] | 40.00 | 40.00 | 40.00 | 100.00 | 40.00 | 40.00 | 40.00 |
| | UBEPOL VCR 412*[2] | — | — | 10.00 | — | — | — | 30.00 |
| | "Nipol" BR 1220*[3] | 60.00 | 60.00 | 50.00 | — | 60.00 | 60.00 | 30.00 |
| | Zinc oxide | 5.00 | 5.00 | 5.00 | 5.00 | 5.00 | 5.00 | 5.00 |
| | stearic acid | 1.50 | 1.50 | 1.50 | 1.50 | 1.50 | 1.50 | 1.50 |
| | anti-oxidant 6C | 1.00 | 1.00 | 1.00 | 1.00 | 1.00 | 1.00 | 1.00 |
| | resin*[4] | 1.00 | 8.00 | 8.00 | 1.00 | 5.00 | 8.00 | 8.00 |
| | KOMOREX 300*[5] | 2.00 | — | — | 1.00 | — | — | — |
| | carbon black LS-HAF | 60.00 | 65.00 | 65.00 | 60.00 | 60.00 | — | 65.00 |
| | carbon black ISAF | — | — | — | — | — | 65.00 | — |
| | insoluble sulfur | 8.40 | 7.50 | 7.50 | 7.50 | 8.40 | 8.40 | 8.40 |
| | accelerator*[6] | 1.20 | 1.20 | 2.50 | 1.50 | 1.20 | 1.20 | 2.50 |
| Properties | $E^*_{20}$ | 12.5 | 17.4 | 23.5 | 9.6 | 18.0 | 20.2 | 30.2 |
| | $E^*_{100}$ | 10.3 | 14.7 | 21.2 | 6.9 | 16.0 | 18.9 | 28.3 |
| | $E^*_{100}/E^*_{20}$ | 0.82 | 0.86 | 0.90 | 0.71 | 0.89 | 0.94 | 0.94 |
| | 100% modulus | 56 | 65 | 80 | 59 | 56 | 78 | 92 |
| | tan δ | 0.10 | 0.28 | 0.33 | 0.15 | 0.16 | 0.38 | 0.30 |
| run-flat durability | | 62 | 100 | 108 | 56 | 85 | 93 | 115 |

*[1]Technically Specified Rubber;
*[2]a tradename for syndiotactic polybutadiene manufactured by UBE Kosan K.K., a corporation of Japan;
*[3]"Nipol" BR 1220 is a tradename for polybutadiene rubber manufactured by Nippon Zeon K.K., a corporation of Japan;
*[4]methacresolformaldehyde resin;
*[5]aromatic oil extender 20% manufactured by Nippon Oil Co., Ltd., a corporation of Japan; and
*[6]N-oxydiethylene-2-benzothiazolyl sulfenamide (OBS).

It can be understood from Table 2 that run-flat durability drops if any one of $E^*_{20}$, ratio $E^*_{100}/E^*_{20}$, 100% modulus and tan δ of the reinforcing liner layer is out of the range stipulated in the present invention.

EXAMPLE 2

Run-flat durability is evaluated for eight kinds of tires B and H through N, shown in Table 3, produced by changing the bead filler height h (mm) and its JIS - A hardness of the tire B used in Example 1. In the table, run-flat durability is expressed by an index using the evaluation result of the tire E as 100.

TABLE 3

| | Bead filler | | |
| --- | --- | --- | --- |
| | Height (h) | JIS-A hardness | Run-flat durability |
| Tire B (This Invention) | 33 mm | 75 | 211 |
| Tire H (Comparative Example) | 43 mm | 90 | 100 |
| Tire I (Comparative Example) | 43 mm | 75 | 102 |
| Tire J (Comparative Example) | 38 mm | 90 | 103 |
| Tire K (Comparative Example) | 38 mm | 75 | 106 |
| Tire L (Comparative Example) | 33 mm | 90 | 132 |
| Tire M (Comparative Example) | 28 mm | 90 | 157 |
| Tire N (This Invention) | 28 mm | 75 | 208 |

It can be understood from Table 3 that if the height h of the bead filler from the rim base is greater than 35 mm, run-flat durability is not improved (tires H through K). In contrast, run-flat hardness can be improved in all of the Tires B, L, M and N wherein the height h is below 35 mm. However, the degree of improvement is low in the tires having a high JIS - A hardness and run-flat durability can be further improved by reducing this hardness (tires B and N).

The reason is believed as follows: In addition to the disposition of the reinforcing liner layer having the crescent sectional shape described already, the local strain of the sidewall portions, particularly near the portions from the upper end of the rim flange to the belt edge of the ground contact portion, can be reduced and the smooth deformation can take place by reducing the height of the bead filler and decreasing its hardness.

EXAMPLE 3

Figure 3:
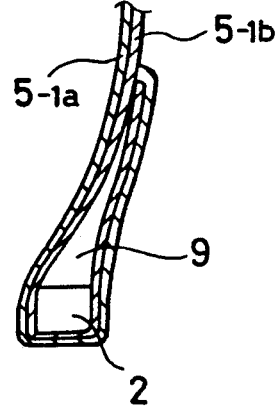
FIGS. 3 and 4 are schematic sectional views, showing the structure of bead portions of tires which are not the tires of the present invention, respectively.
Figure 4:
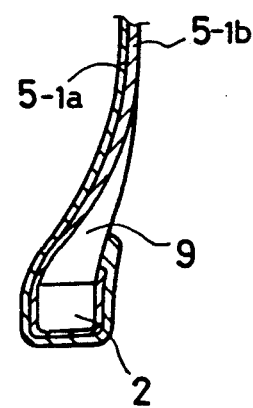

Run-flat durability is evaluated for three kinds of tires O, P and Q produced by changing only the structure near the beads of the carcass layer of the tire B of Example 1, as shown in FIGS. 2, 3 and 4, and for the tire B. The results are tabulated in Table 4. In this table, run-flat durability is expressed by an index using the evaluation result of the tire B as 100.

In the bead portion shown in FIG. 3, both of the two carcass layers 5-1a and 5-1b are turned up around the bead core 2 and the end portions of these carcass layers 5-1a and 5-1b are disposed at positions higher than the height h of the bead filler 9. In the structure shown in FIG. 3, the bead portion shown in FIG. 4 has the structure wherein the end portions of the two carcass layers 5-1a and 5-1b are disposed at positions lower than the height h of the bead filler 9. Furthermore, in the bead portion shown in FIG. 2, both the two carcass layers 5-1a and 5-1b are turned up around the bead core 2, the end portion of one 5-1a of the carcass layers is disposed near the bead core 2 and the end portion of the other carcass layer 5-1b is disposed at a position higher than the height h of the bead filler 9.

TABLE 4

| | Tire B This Invention | Tire O Comparative Example | Tire P Comparative Example | Tire Q This Invention |
| --- | --- | --- | --- | --- |
| Structure around bead | FIG. 1 | FIG. 3 | FIG. 4 | FIG. 2 |
| Run-flat durability | 100 | 63 | 54 | 89 |

As can be understood from the table, Tires O and P have remarkably low run-flat durability. Though run-flat durability of the Tire Q is lower than that of the tire B, it is not lower than that of the tires O and P and the Tire Q has practically usable run-flat durability.

What is claimed is:

1. In a radial tire having an aspect ratio of up to 50%, a run-flat pneumatic radial tire characterized in that:

a reinforcing lining layer having a complex modulus at 20°, ($E^*_{20}$), of at least 16 MPa, a ratio of a complex modulus at 100°, ($E^*_{100}$), to said complex modulus at 20° ($E^*_{20}$), that is, $E^*_{100}/E^*_{20}$ of at least 0.80, a 100% modulus of at least 60 kg/cm$^2$ and a loss tangent (tangent δ) at 100° C. of up to 0.35 said $E^*_{20}$, $E^*_{100}$, and loss tangent at 100° C. being measured under conditions of a frequency of 20 Hz, an initial strain of 5% and a dynamic strain of 1% elongation, and having a crescent sectional shape is disposed inside a carcass layer at sidewall portions in such a manner that one of its end portions overlaps with the end portion of a belt layer of a tread portion and the other end portion overlaps with a bead filler of said bead portion;

said bead filler of said bead portion being made of rubber having a JIS - A hardness of from 60 to 80 and has a height h of from 28 to 33 mm from a base adjacent a rim of said tire in a direction vertical to the axis of rotation of said tire; and said carcass layer consisting of inner and outer two layers, said inner carcass layer is turned up from inside to outside said tire around said bead core so that its end is positioned at a position higher than the height h of said bead filler and an end of said outer carcass layer is disposed axially outward of said bead core; wherein said outer carcass layer is also turned up around said bead core from inside to outside said tire so that said outer carcass layer is on an outer side of said bead core with said end of said outer carcass layer disposed directly adjacent said bead core.

2. A run-flat pneumatic radial tire according to claim 1, wherein the thickness of said reinforcing liner layer having a crescent sectional shape is the greatest at the center portion and decreases gradually towards the upper and lower portions in the radial direction of said tire.

3. A run-flat pneumatic radial tire according to claim 2, wherein the maximum thickness of said reinforcing liner layer at the center portion is from 3 mm to 8 mm.

4. The run-flat pneumatic radial tire according to claim 1, wherein said reinforcing lining layer is made from a rubber including at least one rubber selected from the group consisting of polybutadiene rubber and syndiotactic butadiene rubber.

* * * * *